US012582856B2

(12) United States Patent
Svensson

(10) Patent No.: US 12,582,856 B2
(45) Date of Patent: Mar. 24, 2026

(54) FIRE SUPPRESSION ARRANGEMENT

(71) Applicant: A. Svensson International AB, Växjö (SE)

(72) Inventor: Andreas Svensson, Växjö (SE)

(73) Assignee: A. Svensson International AB (SE)

( * ) Notice: Subject to any disclaimer, the term of this patent is extended or adjusted under 35 U.S.C. 154(b) by 579 days.

(21) Appl. No.: 17/624,909

(22) PCT Filed: Jul. 1, 2020

(86) PCT No.: PCT/EP2020/068548
§ 371 (c)(1),
(2) Date: Jan. 5, 2022

(87) PCT Pub. No.: WO2021/004860
PCT Pub. Date: Jan. 14, 2021

(65) Prior Publication Data
US 2022/0273975 A1 Sep. 1, 2022

(30) Foreign Application Priority Data
Jul. 5, 2019 (EP) .................................... 19184696

(51) Int. Cl.
*A62C 3/16* (2006.01)
*A62C 37/11* (2006.01)
*H01M 10/6568* (2014.01)

(52) U.S. Cl.
CPC ................ *A62C 3/16* (2013.01); *A62C 37/11* (2013.01); *H01M 10/6568* (2015.04)

(58) Field of Classification Search
CPC ........... A62C 3/16; A62C 37/11; A62C 31/02; H01M 10/0525; H01M 10/613;
(Continued)

(56) References Cited

U.S. PATENT DOCUMENTS 4,552,222 A * 11/1985 Goans .................... A62C 35/64
169/42
6,065,546 A * 5/2000 Uetake .................... A62C 35/58
169/61
(Continued)

FOREIGN PATENT DOCUMENTS

CN 104716396 A 6/2015
CN 205752266 U * 11/2016
(Continued)

*Primary Examiner* — Qingzhang Zhou
*Assistant Examiner* — Joel Zhou
(74) *Attorney, Agent, or Firm* — Condo Roccia Koptiw LLP

(57) ABSTRACT

The present invention relates to a fire suppression arrangement (8) for suppressing a fire in a battery pack, such as a lithium-ion battery pack (7), said arrangement (8) comprising said battery pack (7), and a thermal management system (5) comprising a liquid circuit (13) for circulating a liquid to control the temperature of said battery pack (7). The liquid circuit (13) comprises at least one opening (25) which is closed by a sealing member (35) comprising a fusible portion (43), wherein said fusible portion (43) is configured to melt when exposed to a temperature above a predetermined activation temperature, thereby allowing liquid to be discharged from said liquid circuit (13) through said opening (25) to cool a portion of said battery pack (7) in the event of an abnormal temperature rise near said opening (25).

12 Claims, 7 Drawing Sheets

(58) Field of Classification Search
CPC ........... H01M 10/625; H01M 10/6556; H01M 10/6568; H01M 2200/10; H01M 2220/20; H01M 10/42; H01M 10/655; H01M 10/6552; Y02E 60/10
See application file for complete search history.

(56) References Cited

U.S. PATENT DOCUMENTS

| | | | | |
|---|---|---|---|---|
| 9,345,918 B2 * | 5/2016 | Bucher | .................. | A62C 35/62 |
| 2005/0252665 A1 * | 11/2005 | Kammer | ................ | A62C 37/12 169/42 |
| 2005/0257938 A1 * | 11/2005 | Elsey | .................. | A62C 35/026 169/37 |
| 2010/0136391 A1 * | 6/2010 | Prilutsky | .......... | H01M 10/6566 429/62 |
| 2011/0200856 A1 | 8/2011 | Yasui | | |
| 2016/0204483 A1 | 7/2016 | Schilder et al. | | |
| 2018/0104520 A1 * | 4/2018 | Snodgrass | ............... | B05B 7/144 |
| 2019/0077276 A1 | 3/2019 | Capati et al. | | |
| 2019/0237833 A1 * | 8/2019 | Kulp | ................... | H01M 10/486 |

FOREIGN PATENT DOCUMENTS

| | | | | | |
|---|---|---|---|---|---|
| CN | 110420417 A | * | 11/2019 | ............... | A62C 3/16 |
| CN | 111006049 A | * | 4/2020 | ............. | A62C 13/64 |
| CN | 111167048 A | * | 5/2020 | | |
| JP | H114905 A | | 1/1999 | | |
| JP | H1160755 A | | 3/1999 | | |
| JP | H11104260 A | | 4/1999 | | |
| JP | H11221297 A | | 8/1999 | | |
| JP | 2011-060755 A | | 3/2011 | | |
| KR | 10-2011- 0076361 A | | 7/2011 | | |
| WO | 2011007534 A | | 1/2011 | | |
| WO | 2018137374 A1 | | 8/2018 | | |

* cited by examiner

FIRE SUPPRESSION ARRANGEMENT

CROSS REFERENCE TO RELATED APPLICATIONS

This application is the National Stage Entry under 35 U.S.C. § 371 of Patent Cooperation Treaty Application No. PCT/EP2020/068548, filed Jul. 1, 2020, which claims priority from European Application No. 19184696.3, filed Jul. 5, 2019, the contents of each of which are hereby incorporated by reference herein in their entireties.

TECHNICAL FIELD OF THE INVENTION

The present invention relates to a fire suppression arrangement for suppressing a fire in a battery pack, such as a lithium-ion battery pack. The arrangement comprises a battery pack and a thermal management system comprising a liquid circuit for circulating a liquid to control the temperature of said battery pack.

BACKGROUND ART

Rechargeable battery packs, such as lithium-ion battery packs, are widely used in electric vehicles to supply one or more electric motor(s) with power. Upon charging and discharging of such a battery pack heat is generated inside battery cells of the battery pack. In order to ensure proper battery performance and avoid thermal runaway the battery temperature is normally controlled by a thermal management system that keeps the temperature in individual battery cells within a certain temperature range. A typical temperature range is 25-35° C. and various cooling agents and methods are used.

Although battery packs are provided with such a thermal management system there is a risk of thermal runaway and fire. To address this, safety measures in the charging systems and the battery packs may be used. One such measure is an automatic fire suppression system installed close to the battery pack.

However, known systems are considered bulky and/or complex.

SUMMARY OF THE INVENTION

It is an object of the present invention to provide an improved fire suppression arrangement for suppressing a fire in a battery pack.

This and other objects that will be apparent from the following summary and description are achieved by a fire suppression arrangement according to the appended claims.

According to one aspect of the present disclosure there is provided a fire suppression arrangement for suppressing a fire in a battery pack, such as a lithium-ion battery pack, which arrangement comprises a battery pack and a thermal management system comprising a liquid circuit for circulating a liquid to control the temperature of the battery pack. The liquid circuit comprises at least one opening which is closed by a sealing member comprising a fusible portion, wherein said fusible portion is configured to melt when exposed to a temperature above a predetermined activation temperature, thereby allowing liquid to be discharged from said liquid circuit through said opening to cool said battery pack in the event of an abnormal temperature rise near said opening.

The thermal management system may comprise a liquid pump arranged to circulate the liquid through the liquit circuit and a heat exchange unit. During normal operation of the battery back the liquid circulated in the liquid circuit serves to regulate the temperature to remain in a desired range for optimum performance and life of the battery pack. Also, the circulating liquid serves to reduce uneven distribution of temperature throughout the battery pack. Further, during normal operation of the thermal management system, i.e. when cooling or heating the battery pack, there is normally an internal overpressure in the liquid circuit. During normal conditions, the fusible portion of the sealing member acts as a closing plug that, as long as the temperature in the battery pack is below the activation temperature, prevents liquid from being discharged from the opening in which it is arranged. If the temperature at the opening reaches the activation temperature, the fusible portion of the sealing member melts, which opens up the opening. Then, liquid is discharged through the opening. When the fusible portion has melt the opening thus forms a drain hole through which liquid of the thermal management system is discharged, e.g. by the internal pressure in the liquid circuit.

The fire suppression arrangement provides for a combined cooling/heating and fire suppression system. A very space and cost efficient solution may thus be achieved. Furthermore, such a combined solution provides for a solution that is easy to install and that may be retrofitted in a vehicle, such as an electric bus, in an easy manner.

Furthermore, a very efficient suppression arrangement is provided, since liquid, such as coolant, may be discharged at the location where it is most needed. Furthermore, a very robust system is achieved, since no separate detection system is needed.

According to one embodiment the sealing member comprises a mist spraying nozzle, a fluid passage and/or discharge opening of which is sealed by said fusible portion. This embodiment has the advantage that an even more efficient fire suppression is achieved.

According to one embodiment the liquid circuit comprises several openings, each of which is sealed with a sealing member comprising a fusible portion. This embodiment provides for an even more efficient arrangement, since openings may be distributed such that an abnormal temperature rise in any of the battery cells of the battery pack is sensed. A fire in the battery pack may thus be suppressed at a very early stage. If the temperature at any location near a sealed opening reaches the activation temperature, the fusible portion of the sealing member arranged in that opening thus melts and stops acting as a plug. Then, liquid is allowed to be discharged through the opening. Since each opening activates independently when the activation temperature is reached, the number of openings that operate is limited to only those near the fire, which maximizes the available discharging pressure in the area of fire origin. The number of openings that will be opened depends on the location and size of the fire. Hence, several openings may be opened simultaneously, or one after the other, since each opening is opened due to heat generated by the fire. Preferably each of said sealing members comprises a mist spraying nozzle and preferably a nozzle capable of spraying mist in the form of atomized liquid.

According to one embodiment the openings are distributed along the entire length of the liquid circuit. Preferably, the openings are distributed evenly along the entire length of the liquid circuit.

According to one embodiment, the predetermined activation temperature is in the range of 100-160° C., more preferably 120-150° C. and most preferably 130-150° C.

According to one embodiment, the predetermined activation temperature is 100° C., more preferably 120° C. and most preferably 135° C.

According to one embodiment the fusible portion comprises bismuth and/or indium.

According to one embodiment, the fire suppression arrangement further comprises a housing configured to accommodate said battery pack and said liquid circuit.

According to one embodiment the liquid circuit forms an integral part of a said housing. Preferably, the liquid circuit forms an integral part of a bottom portion of said housing.

According to one embodiment the housing is formed from aluminum. According to one embodiment the fire suppression arrangement further comprises a pressure container fluidly connected to the thermal management system by a valve assembly. In this embodiment a pressure container is thus arranged to to pressurize the liquid circuit, and preferably supply the liquid circuit with additional liquid, such as water, when the fusible portion has melt. In this embodiment, the liquid circuit and other parts of the thermal management system are preferably reinforced. Parts of the thermal management system may e.g. be configured to withstand a pressure of at least 70 bar, more preferably at least 90 bar and most preferably at least 100 bar, in order to be capable of distributing pressurized liquid from the pressure container to the opening(s) and/or nozzle(s).

According to one embodiment the valve assembly comprises a release valve.

According to one embodiment the valve assembly comprises a one-way valve.

These and other aspects of the invention will be apparent from and elucidated with reference to the claims and the embodiments described hereinafter.

BRIEF DESCRIPTION OF THE DRAWINGS

The invention will now be described in more detail with reference to the appended drawings in which.

DETAILED DESCRIPTION OF PREFERRED EMBODIMENTS OF THE INVENTION

Figure 1:
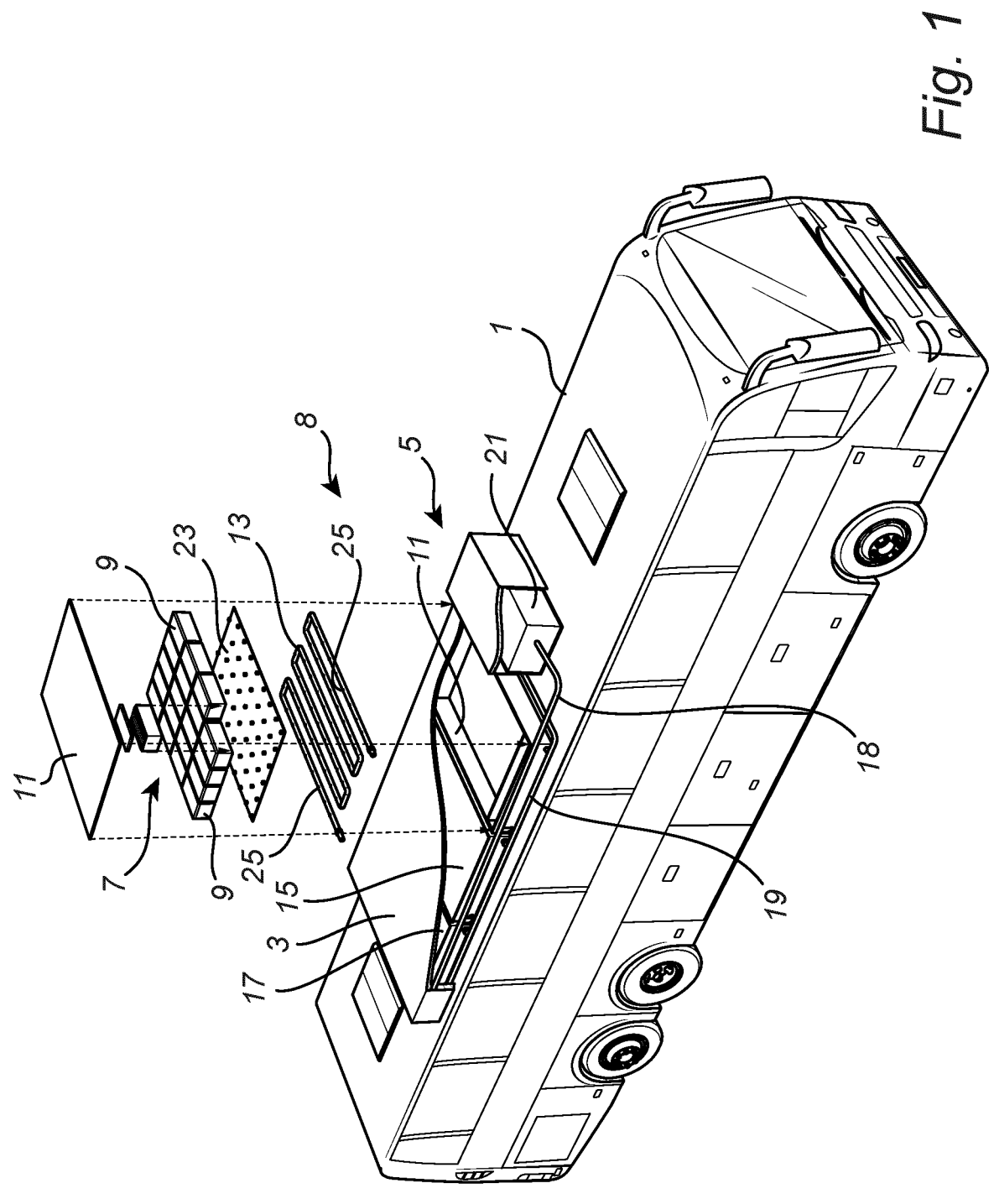
FIG. 1 shows an electric bus provided with a fire suppression arrangement according to an embodiment of the present disclosure.

FIG. 1 shows an electric bus 1 provided with a battery pack assembly 3 and a thermal management system 5. Each of the battery pack assembly 3 and the thermal management system 5 is mounted on the roof of the electric bus 1.

The battery pack assembly 3 comprises three identical battery packs, in the form of a lithium-ion battery packs, a first one 7 of which is visible in FIG. 1. Each of the battery packs 7 is connected to an electric motor (not shown) of the electric bus 1. As illustrated in the exploded part of FIG. 1, the first battery pack 7 comprises several battery modules 9, which are situated in a first housing 11.

The thermal management system 5 comprises a first liquid circuit 13, which is arranged below the first battery pack 7 in the first housing 11, a second liquid circuit (not shown), which is arranged below the second battery pack situated in a second housing 15, and a third liquid circuit (not shown), which is arranged below the third battery pack situated in a third housing 17.

Figure 2:
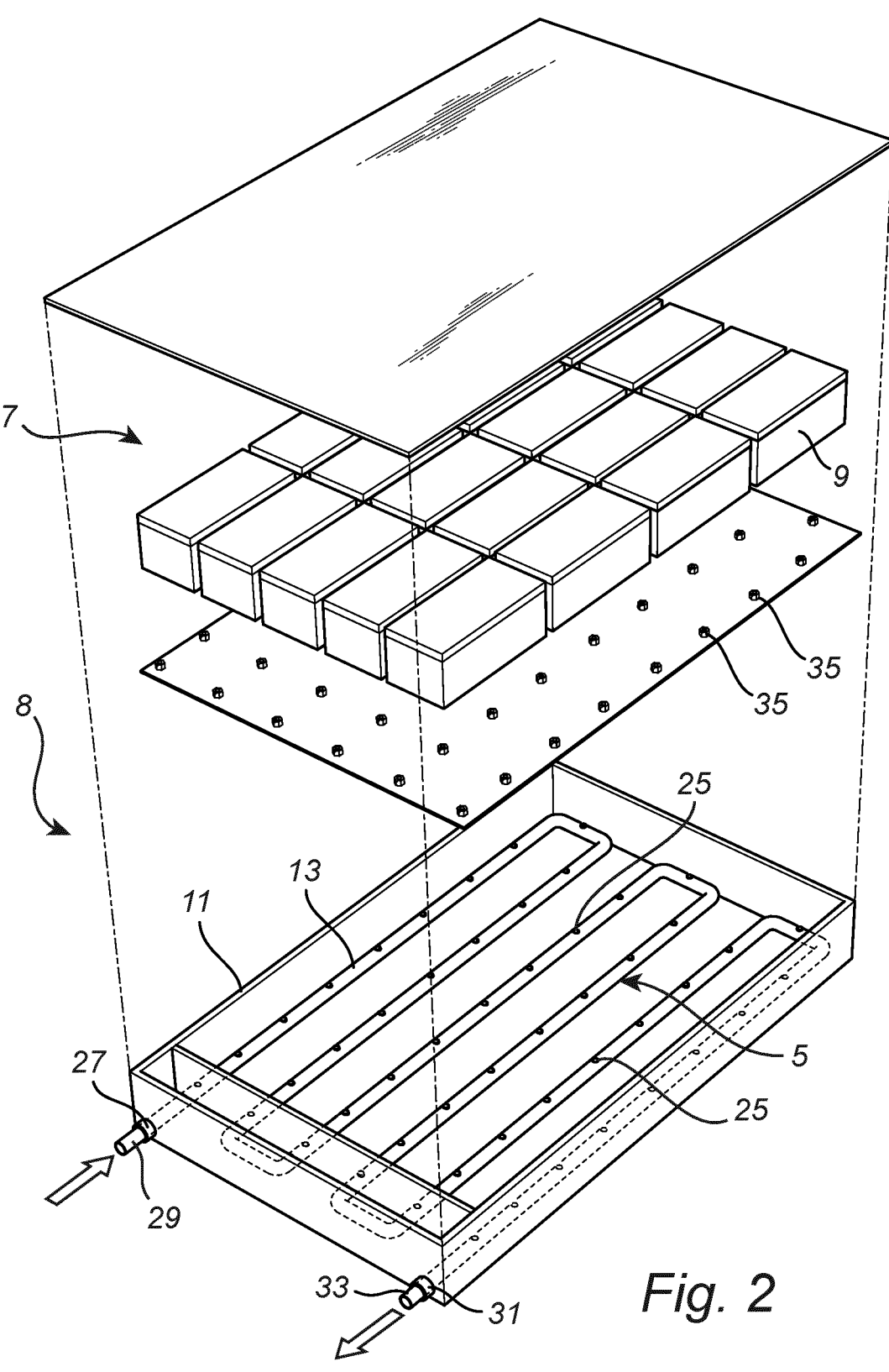
FIG. 2 illustrates a battery pack and a liquid circuit of the fire suppression arrangement shown in FIG. 1.

The liquid circuit 13 is a pipe that extends back and forth throughout the housing 11 in a zigzag manner, as illustrated in FIG. 2.

The thermal management system 5 further comprises a feed pipe system 18, a return pipe system 19, a heat exchange unit 21, and a liquid pump (not shown) arranged to circulate liquid throughout each of the liquid circuits 13. The thermal management system 5 serves to control the temperature of the battery packs 7 of the battery pack assembly 3. The thermal management system 5, which forms a liquid cooling/heating system, is thus configured to maintain each battery pack 7 at a temperature in a certain temperature range, e.g. 25-35° C. Between the first liquid circuit 13 and the first battery pack 7 there is arranged a perforated support plate 23 which supports the battery modules 9 of the first battery pack 7 and protects the liquid circuit pipe 13 from damage.

The first liquid circuit 13 comprises several openings 25 which are evenly distributed along the entire length of the liquid circuit 13. Each such opening 25 is sealed with a sealing member comprising a fusible portion. The first battery pack 7 and the thermal management system 5 together form a fire suppression arrangement 8 according to an embodiment of the present disclosure.

Now referring to FIG. 2, the first liquid circuit 13 has a liquid inlet 27, to which a feed pipe 29 of the feed pipe system 18 is connected, and a liquid outlet 31 to which a return pipe 33 of the return pipe system 19 is connected.

Each of the openings 25 is sealed with a sealing member comprising a fusible portion. In this embodiment, each opening 25 is sealed by a sealing member in the form of a nozzle 35. A nozzle 35 is thus arranged in each of the openings 25 of the liquid circuit 13. The nozzles 35 are e.g. screwed into the liquid circuit pipe 13. In this embodiment the openings 25 are thus sealed by a sealing member comprising a nozzle 35. It is however appreciated that the opening(s) 25 may be sealed by another type of sealing member, such as a fusible plug or a fusible composition. The suppression arrangement 8, which is formed by the first battery pack 7 and the thermal management system 5, is capable of suppressing a fire and/or preventing thermal runaway in the battery pack 7.

Figure 3:
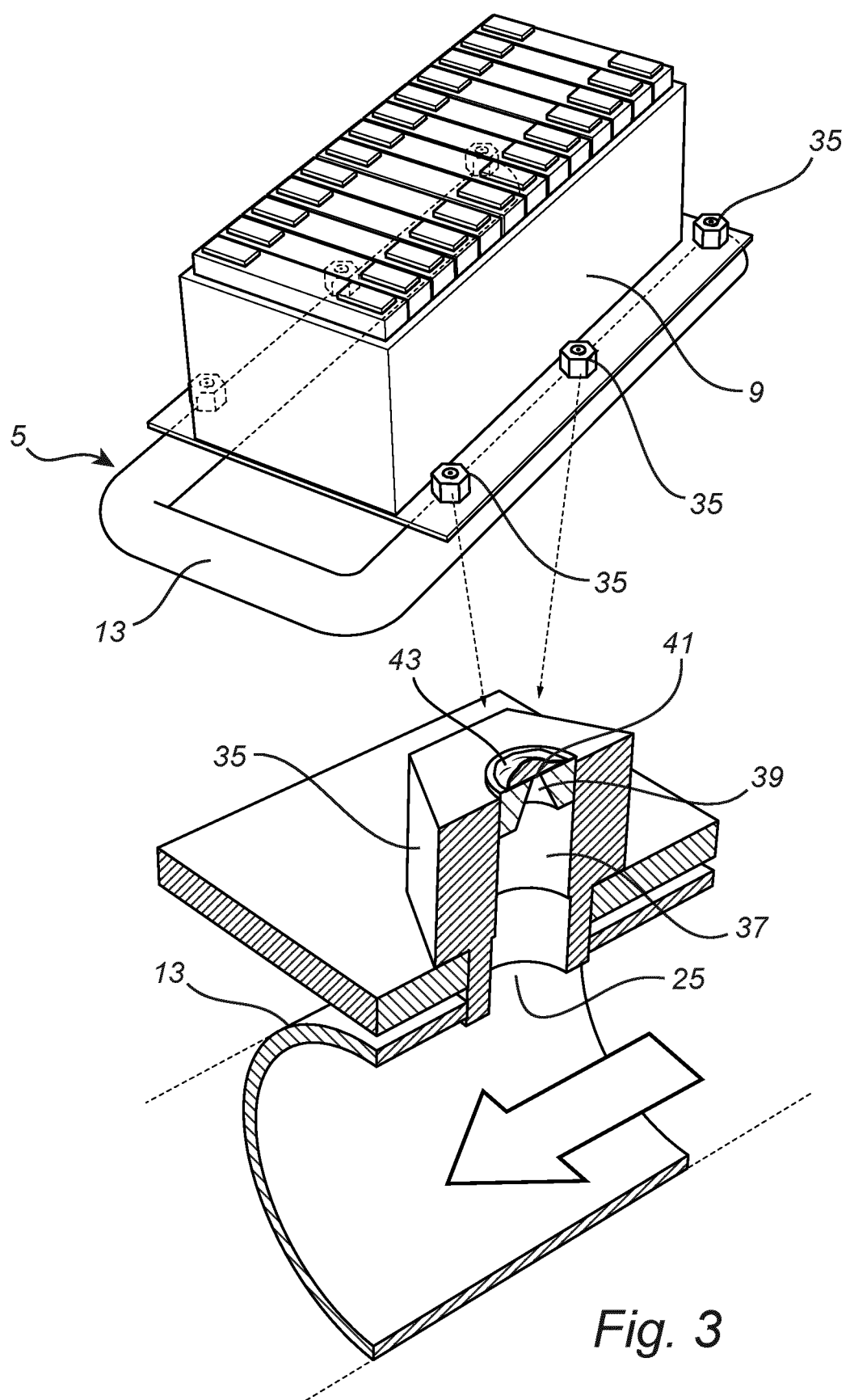
FIG. 3 illustrates a part of the liquid circuit of the fire suppression arrangement shown in FIG. 1.

Now referring to FIG. 3, each nozzle 35 has a fluid passage 37 with a tapering portion 39, as seen in the fluid direction of the nozzle 35, and a discharge opening 41. The tapering portion 39 render it possible to discharge liquid in the form of mist, e.g. in the form of atomized water. The discharge opening 41 of each nozzle is sealed by a fusible portion 43. In this embodiment, the fusible portion 43 is an alloy comprising bismuth and having a melting point of about 140° C. Preferably, the predetermined activation temperature is in the range of 135-145° C.

Figure 4A:
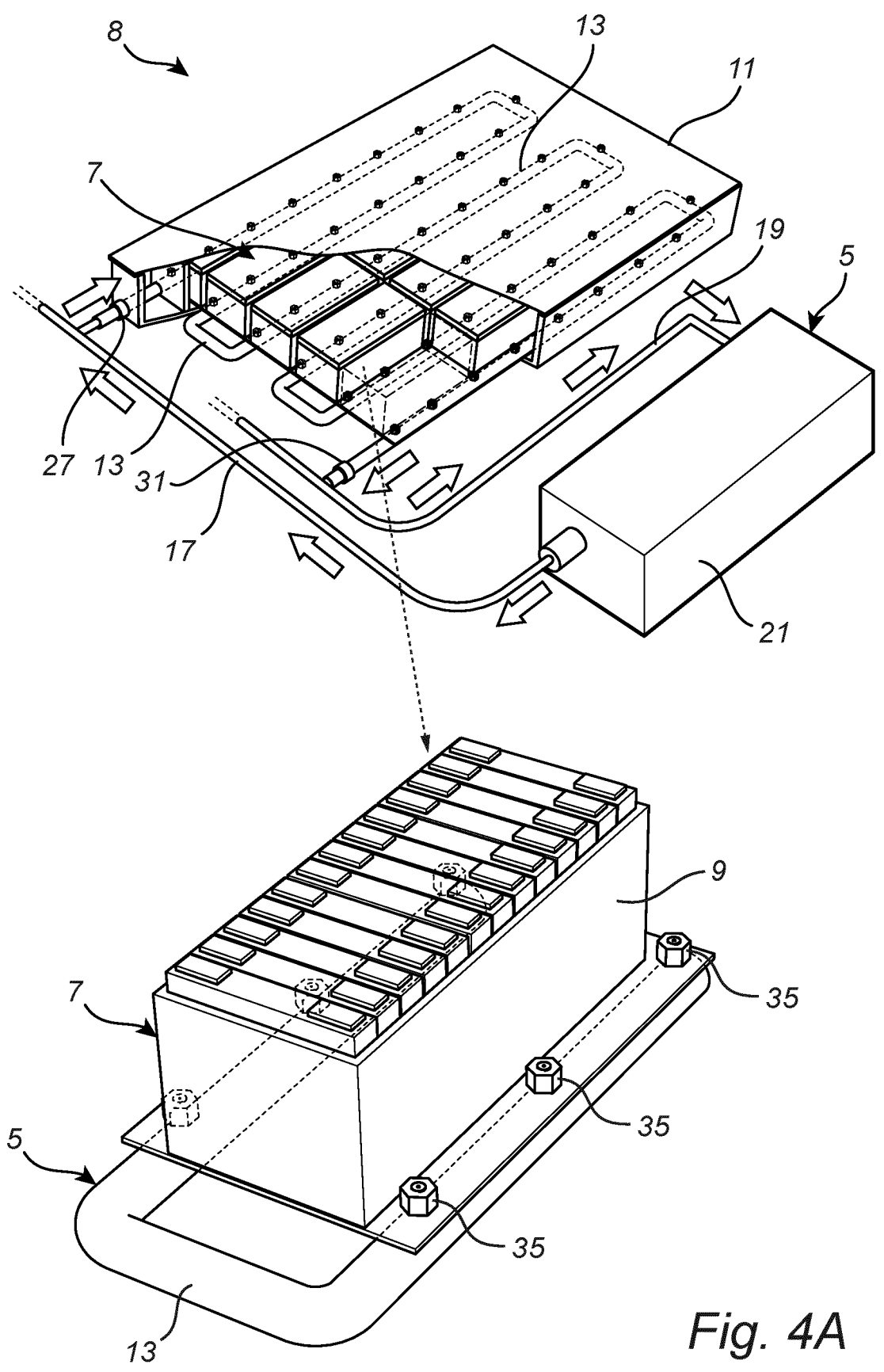
FIGS. 4A-C serve to illustrate the function of the fire suppression arrangement shown in FIG. 1.
Figure 4B:
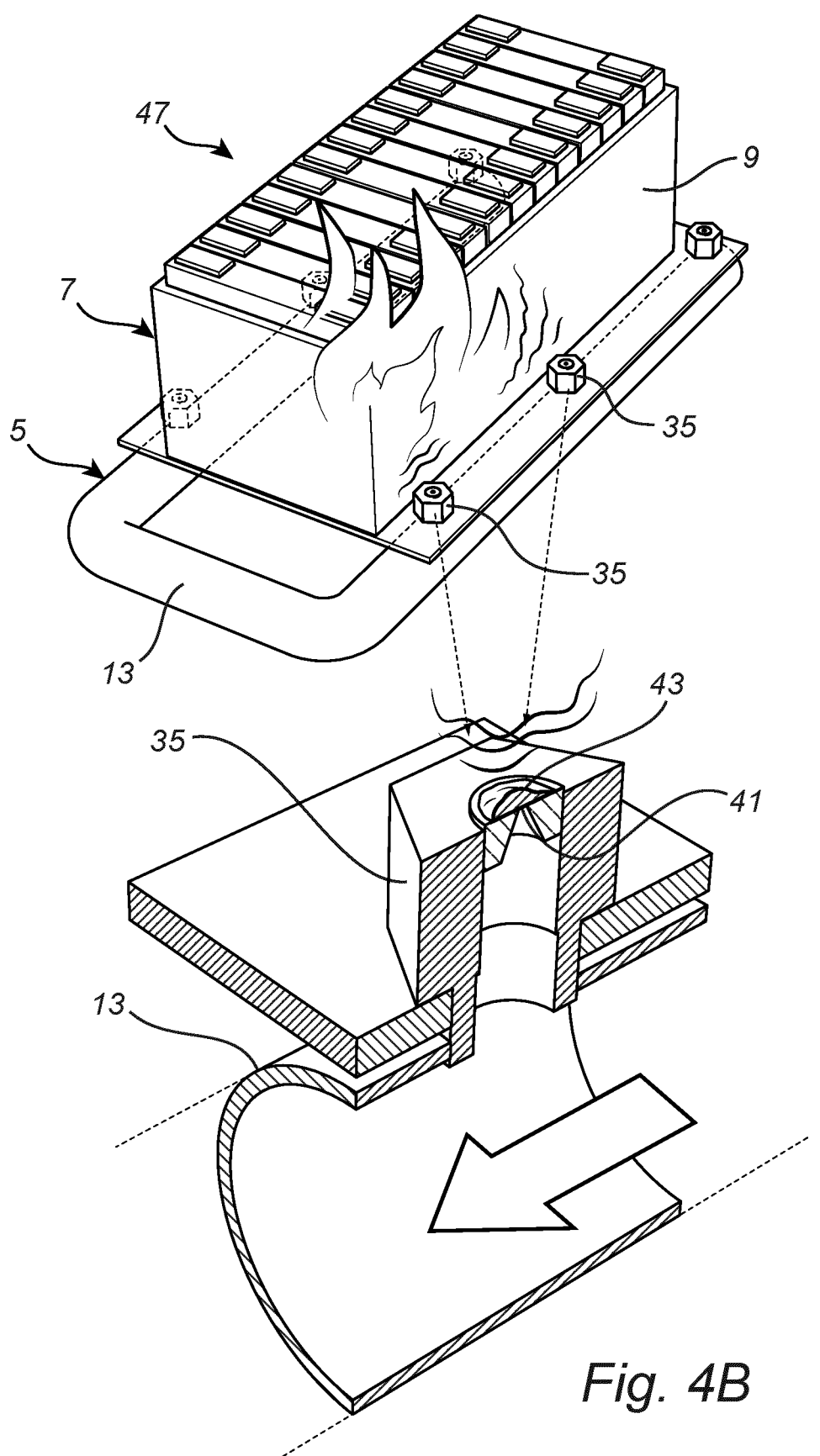
Figure 4C:
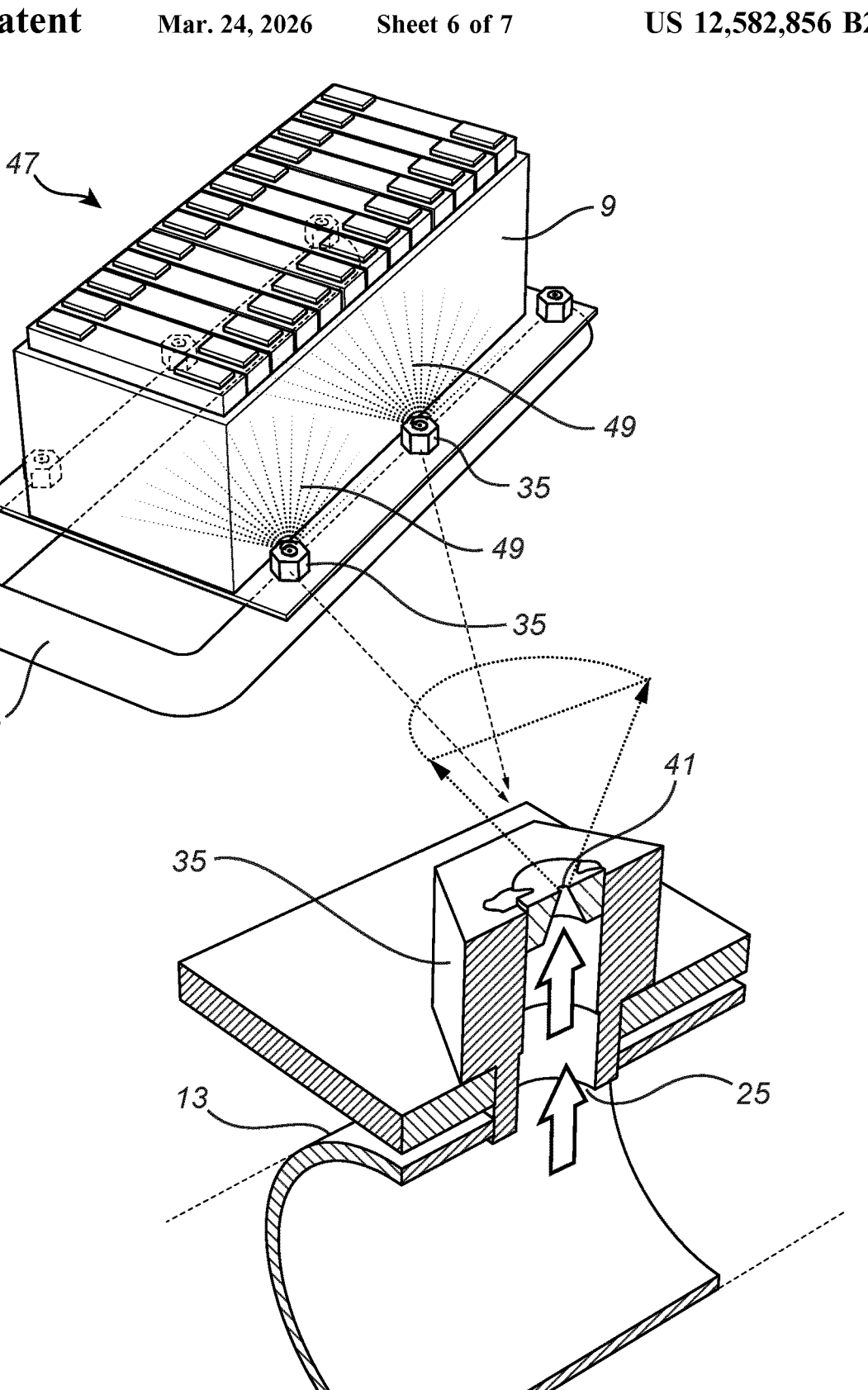

With reference to FIGS. 4A-C, the function of the fire suppression arrangement 8 will be described hereinafter.

FIG. 4A illustrates a state in which the first battery pack 7 operates at a temperature within a desired temperature range. Typically, the temperature in the battery pack 7 is then in the range 25-35° C. Then, liquid is circulated in the liquid circuit 13, as illustrated by arrows. Liquid is thus fed throughout the liquid circuit pipe 13 from the inlet 27 and travels, in a zigzag manner, to the outlet 31 of the liquid circuit 13. Heat may then be removed from the battery pack 7 via the heat exchange unit of the thermal management system 5.

FIG. 4B illustrates a fire, illustrated by flames, in battery cells 47 of one of battery module 9 of the battery pack 7. Then, the fusible portions 43 of two nozzles 35 are subjected to an abnormal temperature rise.

When the temperature at the nozzles 35 exceeds a predermined activation temperature, in this case 140° C., the fusable portion 43 in the nozzle 35 melts, as illustrated in FIG. 4C, which opens the discharge opening 41 of the nozzle 35. Then, liquid from the liquid circuit 13 is discharged through the discharge opening 41 of the nozzle 35, as illustrated by arrows in FIG. 4c, into the space where the battery module 9 is situated to cool the battery cells 47 thereof. A fluid passage from the liquid circuit 13 of the thermal management system 5 to the area where a fire is present is thus established due to heat generated by the fire in the battery cells 47. The liquid is discharged through the nozzles 35 as mist 49 in the form of atomized liquid, as illustrated in the upper part of FIG. 4C. The mist cools battery cells 47 of the battery module 9 in a very efficient manner, which suppresses the fire.

Hereinafter a fire suppression arrangement 108 according to a second embodiment will be described with reference to FIG. 5. Many features disclosed in the first embodiment are also present in the second embodiment with similar reference numerals identifying similar or same features. Having mentioned this, the description will focus on explaining the differing features of the second embodiment.

The second embodiment differs from the first embodiment in that the fire suppression arrangement 108 comprises a pressure container 51. The pressure container 51 is arranged to pressurize and supply the liquid circuit of the fire suppression arrangement 108 with additional liquid, in the form of pressurized liquid, in the event of a fire. To this end the pressure container 51 may be filled with liquid, e.g. water or other extinguishing liquid, and drive gas to approximately 100 bar. In this embodiment parts of the thermal management system 5, e.g. pipes of the feed pipe system, liquid circuit and return pipe system, are reinforced to be able to withstand a pressure of at least 100 bar.

Figure 5:
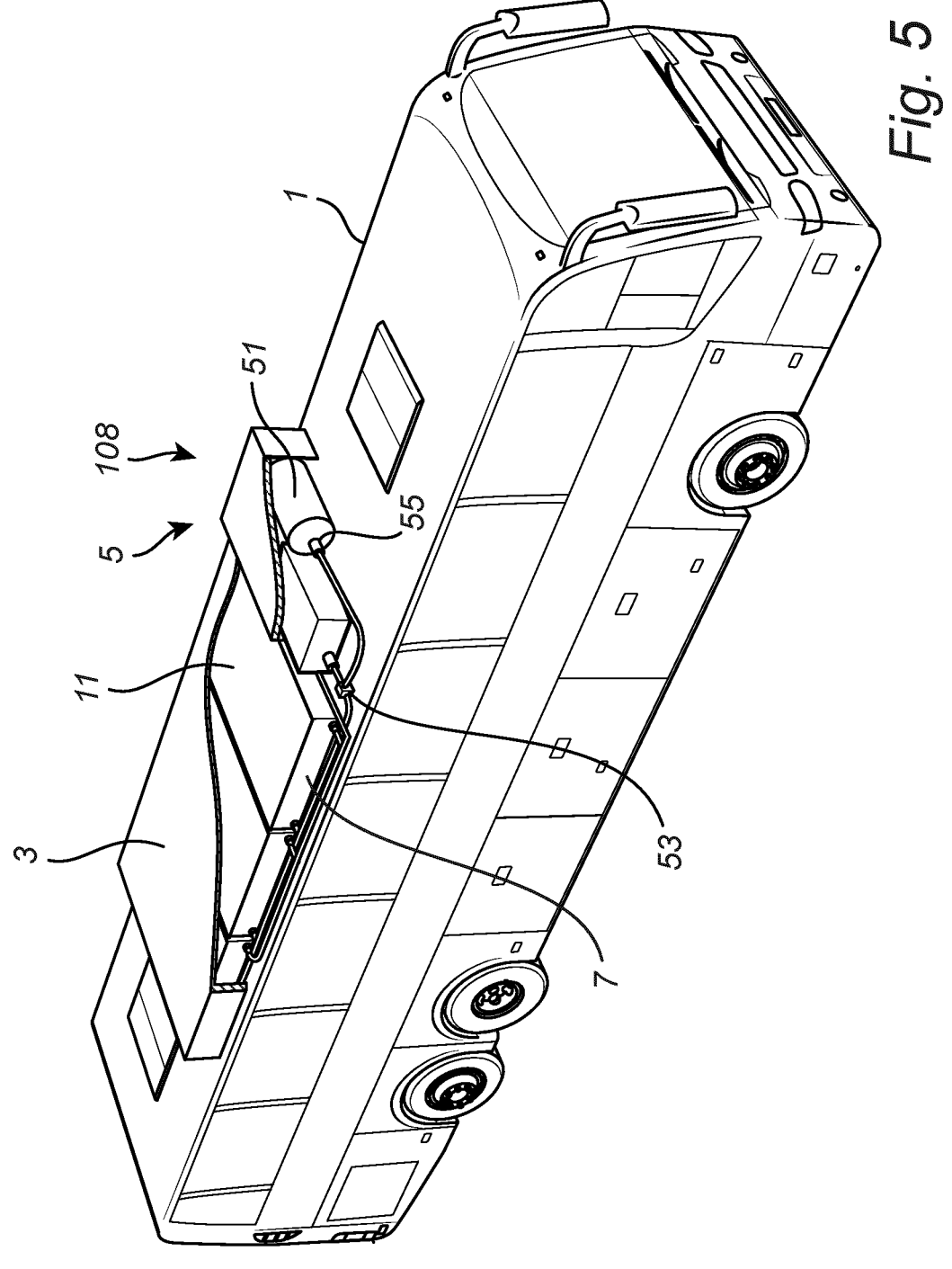
FIG. 5 illustrates a fire suppression arrangement according to a second embodiment of the present disclosure.

The pressure container 51 is provided with a release valve 55 and is connected to the liquid circuit by a pipe coupling assembly 53, as schematically illustrated in FIG. 5. The release valve 55 may be configured to open in response to a pressure drop in a liquid circuit of the fire suppression arrangement 108 and/or by a separate sensing system. The pressure container 51 is thus arranged for distribution of pressurized liquid from the pressure container 51 to one or more opening(s) and/or nozzle(s) of a liquid circuit of the thermal management system 5 in the event of a fire in a battery pack 7. In this embodiment a pressure container provided with a release valve is thus connected to the liquid circuit via a pipe coupling. It is however appreciated that a pressure container may be directly connected to the liquid circuit by a valve assembly, e.g. by a release valve or a one-way valve.

It will be appreciated that numerous variants of the embodiments described above are possible within the scope of the appended claims.

The invention claimed is:

1. A thermal management and fire suppression system, comprising:
 a battery pack; and
 a liquid circuit for circulating a liquid to control a temperature of the battery pack;
 wherein said liquid circuit comprises at least one opening that is sealed by a mist spraying nozzle, the mist spraying nozzle having a discharge opening, wherein the discharge opening of the mist spraying nozzle is sealed by a fusible portion that covers the discharge opening; and
 wherein the fusible portion is configured to melt when exposed to a temperature above a predetermined activation temperature, thereby allowing the circulating liquid to be discharged from said liquid circuit through the discharge opening of the mist spraying nozzle to cool a portion of said battery pack.

2. The system of claim 1, wherein the battery pack is a lithium-ion battery pack.

3. The system of claim 1, wherein the fusible portion comprises at least one of bismuth or indium.

4. The system of claim 1, wherein the activation temperature is 100° C.

5. The system of claim 1, wherein the activation temperature is 120° C.

6. The system of claim 1, wherein the activation temperature is 135° C.

7. The system of claim 1, further comprising a housing that is configured to enclose the liquid circuit and the battery pack.

8. The system of claim 1, wherein said mist spraying nozzle defines a fluid passage that is sealed by said fusible portion.

9. The system of claim 1, wherein said liquid circuit comprises a plurality of openings, each of which is sealed with a respective mist spraying nozzle comprising a respective fusible portion.

10. The system of claim 9, wherein each of said mist spraying nozzles has a respective discharge opening, and wherein the discharge openings of the mist spraying nozzles are sealed by the respective fusible portions.

11. The system of claim 7, wherein said liquid circuit is integrally formed as a part of said housing.

12. The system of claim 1, further comprising a pressure container that is fluidly connected to the thermal management system by a valve assembly.

* * * * *